Figure 1:
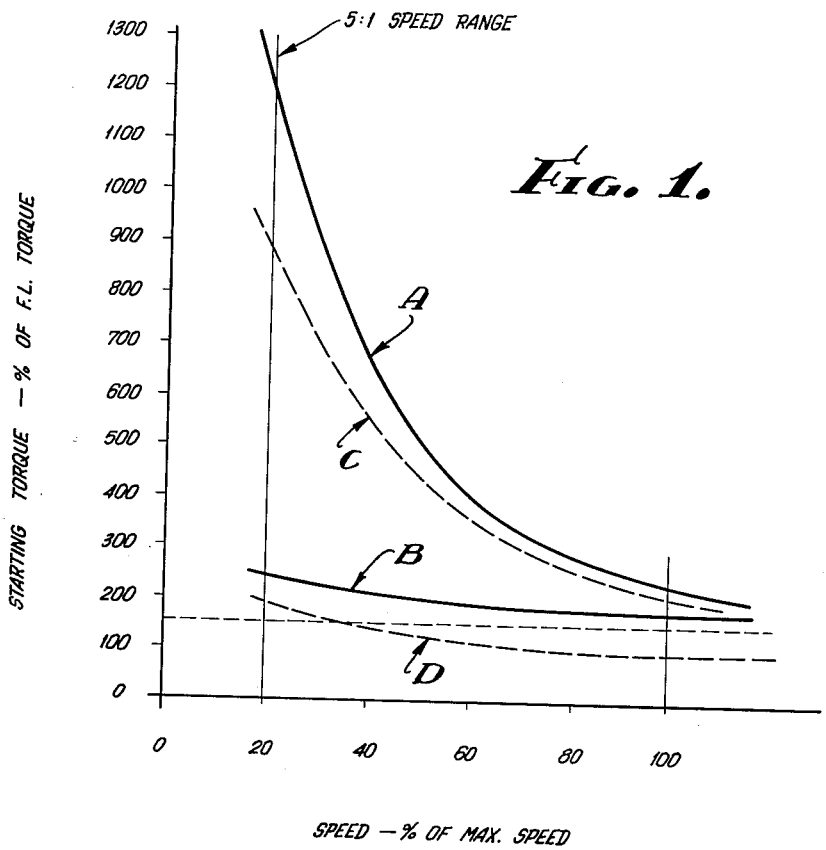

Robert J. Carlson
INVENTOR.

BY Flam and Flam
ATTORNEYS.

3,045,153
SYSTEM FOR CONTROLLING THE STARTING
TORQUE OF INDUCTION MOTOR DRIVES
Robert J. Carlson, Orange, Calif., assignor to U. S. Electrical Motors, Inc., Los Angeles, Calif., a corporation of California
Filed Jan. 4, 1960, Ser. No. 235
10 Claims. (Cl. 318—11)

This invention relates to induction motors, and particularly to the control of starting torque of a three-phase motor.

Motors of this character, when started on full-line voltage, exhibit high starting torque characteristics. While in many types of loads such high torques are advantageous, there are some loads that require a soft start, i.e., one in which the starting torque is very much less than would be provided by impressing line voltage across the primary windings. Especially is this the case where a variable ratio transmission mechanism is interposed between the motor and the load. Such a transmission mechanism, when reducing the speed, has a correspondingly increased torque. Sudden jerks at the start of the motor can result in substantial damage.

A few instances of loads that require a soft start may be mentioned. For example, material placed on motor-driven belt conveyors would intolerably shift position or fall off the conveyor if started too quickly or with a jerk. In paper-handling machines, such as printing presses, sudden starting would tear the paper. In machinery for handling plastic sheets, the material is apt to be broken or permanently stretched by a quick start. As a concluding example, we may consider extruders or similar machines which use heated materials, and started with the material cold. The machines in these cases require fairly high starting torque; however, when using a variable ratio transmission mechanism without torque control, far too much torque would be applied to the load, which could damage the machine, the mold, the gears or the transmission mechanism.

It is one of the objects of this invention to obviate such occurrences by ensuring that during the starting period the torque will be kept well below an undesirable high value, and by the aid of relatively inexpensive elements.

It is another object of this invention to control the starting torque of an induction motor (with or without a variable ratio transmission mechanism) by the simple expedient of providing an adjustable impedance in only one of the supply mains to the motor.

It is still another object of this invention to make it possible automatically to restore substantially full-line voltage across all phases of the motor to attain normal running operation shortly after the motor is started.

It is still another object of this invention to adjust the value of the impedance automatically in response to the setting of the variable ratio transmission mechanism so that as the output speed is decreased, the value of the impedance is increased so as to compensate for the increase in the torque provided by the mechanism.

It is still another object of this invention to provide a saturable reactor as the impedance in which a saturating winding is used, whereby a relatively minor controlled current in the saturating winding may be used to effect a complete range of starting torque adjustment.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Figure 2:
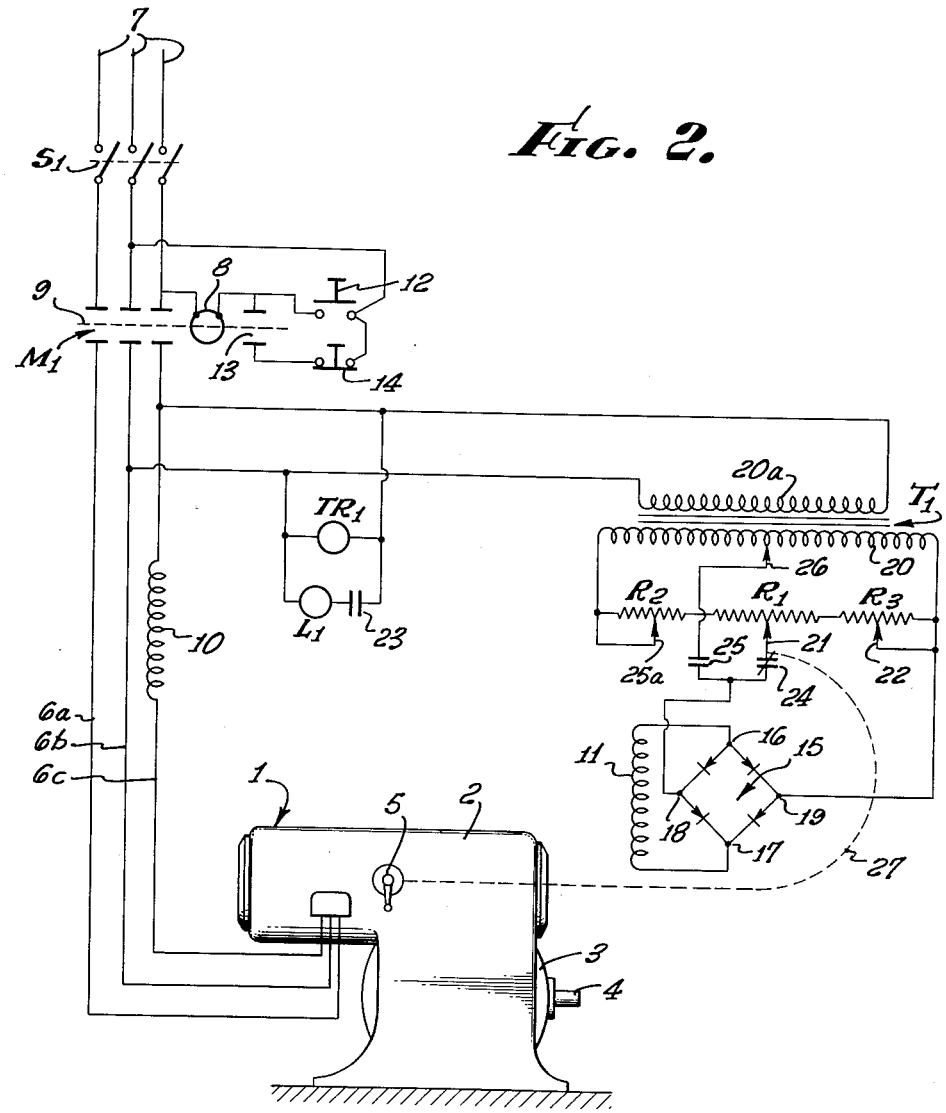

Referring to the drawings:

FIGURE 1 is a collection of curves or graphs illustrating the speed-torque characteristics under certain conditions of operation of an induction motor, and exhibiting the desirable characteristics attributable to this invention; and FIG. 2 is a schematic wiring diagram of one embodiment of the invention.

In FIG. 2, there is diagrammatically shown an induction motor 1 enclosed in a housing or casing 2. The casing also accommodates a variable ratio transmission mechanism 3, having a load driving or output shaft 4. The induction motor 1 is coupled to the input side of the transmission mechanism 3. The ratio of transmission is controllable or adjustable by the aid of a crank or handle 5 available exterior of the casing 2. An example of such a variable ratio transmission mechanism structure is illustrated in Patent No. 2,398,235 issued to Frederick O. Luenberger on April 9, 1946.

The motor 1 is fed, in this instance, from three-phase leads 6a, 6b, 6c, capable of being supplied from a source of electrical energy by the aid of the mains 7. A main switch $S_1$ is included in the motor circuit. Also included in series in the motor circuit is a contactor $M_1$ operated by an electromagnet 8. When the electromagnet 8 is de-energized, the motor circuit is opened; and, on the other hand, when the electromagnet 8 is energized, the motor circuit closes, as indicated by the line 9, provided the main switch $S_1$ is closed.

Referring to FIG. 1, the full-line graph or curve A represents the starting torque measured at output shaft 4 for various ratios of the variable ratio transmission mechanism 3, in which the full-line electromotive force is supplied to the stator windings of motor 1. At the start of operations and with the variable ratio transmission mechanism 3 adjusted to a 5:1 ratio, the starting torque available at the output shaft 4 is many times greater than the torque at full speed. Such starting conditions, as hereinabove specified, are highly undesirable in connection with many types of loads, as discussed hereinabove.

It is therefore necessary, during the starting period, to reduce the starting torque to a value comparable with the normal operating torque of the induction motor.

Considering now FIG. 2, if it be assumed that lead 6c is disconnected, the motor 1 would have no starting torque at all, for then the primary or stator winding would operate as a single-phase winding; and no starting torque is developed under such circumstances. Obviously by controlling the current in lead 6c, as by the aid of an impedance 10, the starting torque can be controlled. During the starting period, the impedance 10 should be quite high so as to cause the starting torque to be represented, for example, by the graph B of FIG. 1. The impedance 10, as soon as the starting interval may be completed, is reduced to substantially zero so that the torque at full speed would correspond to that of graph A.

In the present instance, in FIG. 2, the impedance 10 is a saturable reactor having a saturating winding 11. This saturating winding is shown for convenience in the left-hand portion of the figure. The greater the saturating winding, the less impedance 10 becomes. During the starting period, the saturating current in the winding 11 is quite low so that a substantial impedance is included in the lead 6c.

The starting of the motor 1 is accomplished by pushing a start button 12. This start button completes the circuit for the electromagnet 8 across one phase of the three-phase supply lines for operating the contactor $M_1$.

As soon as the start button is pressed, a holding circuit is established through contacts 13 and a normally closed stop button 14, which shunts the contacts controlled by start button 12. Accordingly, to stop the operation of the motor, the stop button 14 can be pressed to open the holding circuit.

As soon as the motor 1 is energized through the contactor $M_1$, a relatively low direct current is supplied to the control winding 11. This direct current winding is fed through a rectifier 15. The terminals 16 and 17 correspond to the output of the rectifier across which the winding 11 is connected.

The input terminals 18 and 19 derive energy from the mains through a secondary winding 20 of a transformer $T_1$ having a primary winding $20a$. This winding is supplied with energy across one phase of the supply circuit.

Bridging the secondary winding 20 are a series of resistors $R_2$, $R_1$ and $R_3$. Resistors $R_2$ and $R_3$ are adjustable, as indicated, by the aid of the movable taps 25 and 22. An adjustable intermediate tap 21 is provided for the center resistor $R_1$.

The rectifier circuit for the winding 11 during the starting period may now be traced; considering tap 21 to be positive, then from tap 21, through normally closed contacts 24, terminal 18, terminal 17, winding 11, terminals 16 and 19, to tap 22. When tap 22 is positive, the circuit is as follows: tap 22, terminals 19 and 17, winding 11, terminals 16 and 18, to tap 21. The potential drop of the resistance included betwen the taps 21 and 22 is available for the input circuit. By appropriate adjustment of the taps 21 and 22, the saturating current in winding 11 may be adjusted to comply with the desired starting torque of the motor 1. The resistors $R_1$, $R_2$ and $R_3$ thus serve together as a potentiometer resistance across the winding 20.

This starting condition lasts for a relatively short period, as determined by the time-delay relay $TR_1$. This time-delay relay is energized immediately upon closing of the contactor $M_1$. However, an adjustable predetermined interval must elapse before it closes the normally open contacts 23, operated upon energization of the relay $TR_1$. As soon as this starting period terminates, the contacts 23 close and a relay coil $L_1$ is energized. This relay coil $L_1$, as soon as it energizes, opens the normally closed contacts 24, and closes the normally open contacts 25. Accordingly, the input circuit, as hereinbefore traced for the rectifier 15, is interrupted. However, a relatively high potential is connected across the input terminals 16 and 17 via the closed contacts 25. The running condition for the saturating current in winding 11 is now at such a high value as to reduce materially the impedance of the reactor 10.

The energizing circuit for the winding 11 may now be traced as it exists when relay coil $L_1$ is energized. When the right-hand terminal of the secondary winding 20 is positive, the circuit is as follows: from the right-hand terminal of the secondary winding 20, terminals 19 and 17, winding 11, terminals 16 and 18, contacts 25, and adjustable center tap 26 of winding 20.

When the left-hand terminal of the secondary 20 is positive, a similar circuit may be traced as follows: from positive tap 26, contacts 25, terminals 18 and 17, winding 11, terminals 16 and 19, back to the right-hand terminal of winding 20.

The controlling current in winding 11 represents only a small percentage of the kilovolt-ampere rating of the reactor 10. Accordingly, the control for the entire range is accomplished by little expenditure of energy.

By adjusting the effective values of resistors $R_2$ and $R_3$, the starting characteristics may be accordingly adjusted. For example, by increasing the value of resistors $R_2$ and $R_3$ by appropriate adjustment of their respective taps 22 and $25a$, the saturating current in winding 11 is reduced, which causes an increase in the reactor 10. The curve or graph D of FIG. 1 corresponds to the low value of the range of adjustment. On the other hand, decreasing the resistors $R_2$ and $R_3$ causes an increased current in the winding 11, and a corresponding decrease in the effective value of reactor 10. Curve or graph C represents the torque when the resistors $R_2$ and $R_3$ are at a minimum. The resistor $R_3$ is purposely so arranged that even when the resistor $R_1$ is reduced to zero, there is still a residual resistance across which a potential drop is effective for the input to rectifier 15.

It is advantageous to adjust the input to the rectifier 15 (during the starting period) in accordance with the adjustment of the variable ratio transmission mechanism 3. Accordingly, a mechanical coupling 27 may be provided between the adjusting handle 5 and the tap 21. As the ratio of transmission is reduced, thereby increasing the shaft speed, the tap 21 can be moved toward the left to increase the saturating current in winding 11 and thereby to reduce the effective value of reactor 10. As the handle 5 is manipulated to reduce the speed of shaft 4, the center tap 21 is moved toward the right to cause an increase in the impedance of the reactor 10.

The inventor claims:

1. In combination: a multi-phase induction motor; an adjustable impedance in series in one of the phases; an adjustable ratio transmission mechanism operated by the motor; and means responsive to adjustment of the transmission for correspondingly adjusting the impedance in such manner that as the ratio of speed reduction increases, the impedance also increases.

2. In combination: a multi-phase induction motor; leads for supplying electrical energy to the motor; an adjustable saturable reactor in one of the leads; an adjustable ratio transmission mechanism operated by the motor; and means responsive to adjustment of the transmission for correspondingly adjusting the degree of saturation of the reactor in such manner that as the ratio of speed reduction increases, the impedance of the reactor increases.

3. The combination as set forth in claim 1, with the addition of time-delay means for causing the impedance to assume a set normal value.

4. The combination as set forth in claim 2, with the addition of time-delay means for causing the reactor to assume a set normal value.

5. The combination as set forth in claim 1, with the addition of means for independently adjusting the speed-torque characteristic of the motor during the starting period.

6. The combination as set forth in claim 1, in which the adjustable reactance is adjusted by the aid of an auxiliary impedance, and with the addition of at least another auxiliary impedance in series with the first auxiliary impedance, said other auxiliary impedance being independently adjustable for adjusting the speed-torque characteristic of the motor during the starting period.

7. The combination as set forth in claim 2, in which the means for adjusting the degree of saturation of the reactor includes a saturating winding, and an adjustable resistor in series with the winding, and with the addition of an auxiliary adjustable resistor in series with the said adjustable resistor for independently adjusting the speed-torque characteristic of the motor during the starting period.

8. The combination as set forth in claim 6, with the addition of time-delay means for causing the impedance to assume a set normal value upon termination of the starting period.

9. In combination: a multi-phase induction motor; an adjustable ratio transmission mechanism connected to the motor for varying the range of the ratio from a maximum to a minimum value, corresponding respectively to the largest speed reduction to the smallest speed reduction, whereby a load may be started at the lower speeds; said mechanism having means for adjusting the said ratio; an adjustable impedance in one of the phases of the motor; said impedance having means for adjusting its value from a minimum to a maximum; a coupling between said impedance adjusting means and the ratio adjusting means; said coupling being such that maximum ratio corresponds to maximum impedance for facilitating starting of the motor at low speed and at relatively low torque.

10. In combination: a multi-phase induction motor; an adjustable ratio transmission mechanism connected to the motor for varying the range of the ratio from a maximum to a minimum value, corresponding respectively to the largest speed reduction to the smallest speed reduction, whereby a load may be started at the lower speeds; said mechanism having means for adjusting the said ratio; an adjustable saturable reactor connected in one of the phases of the motor; said reactor having a direct current winding and means for adjusting the current in said winding correspondingly to adjust the value of the reactance provided by the reactor from a minimum to a maximum; a coupling between said current adjusting means and the ratio adjusting means; said coupling being such that maximum ratio corresponds to maximum impedance for facilitating starting of the motor at low speed and at relatively low torque.

References Cited in the file of this patent

UNITED STATES PATENTS

| | | |
|---|---|---|
| 657,516 | Coleman | Sept. 11, 1900 |
| 2,647,231 | Cortelli | July 23, 1953 |

FOREIGN PATENTS

| | | |
|---|---|---|
| 773,135 | Great Britain | Apr. 24, 1957 |